(12) United States Patent
Walz et al.

(10) Patent No.: US 11,037,212 B2
(45) Date of Patent: Jun. 15, 2021

(54) PRE-POPULATING A CREDIT CARD NUMBER FIELD

(71) Applicant: Comenity LLC, Columbus, OH (US)

(72) Inventors: James Walz, Blacklick, OH (US); Karen Lowe, Nashport, OH (US); David Nack, Bexley, OH (US)

(73) Assignee: Comenity LLC, Columbus, OH (US)

( * ) Notice: Subject to any disclaimer, the term of this patent is extended or adjusted under 35 U.S.C. 154(b) by 458 days.

(21) Appl. No.: 14/556,915

(22) Filed: Dec. 1, 2014

(65) Prior Publication Data

US 2016/0155160 A1 Jun. 2, 2016

(51) Int. Cl.
| | |
|---|---|
| *G06Q 30/00* | (2012.01) |
| *G06Q 30/06* | (2012.01) |
| *H04W 12/06* | (2021.01) |
| *G06Q 20/12* | (2012.01) |
| *G06Q 20/40* | (2012.01) |
| *G06Q 20/32* | (2012.01) |
| *G06Q 20/34* | (2012.01) |
| *G06Q 20/24* | (2012.01) |
| *H04W 88/02* | (2009.01) |

(52) U.S. Cl.
CPC ......... *G06Q 30/0601* (2013.01); *G06Q 20/12* (2013.01); *G06Q 20/24* (2013.01); *G06Q 20/322* (2013.01); *G06Q 20/346* (2013.01); *G06Q 20/3552* (2013.01); *G06Q 20/409* (2013.01); *H04W 12/06* (2013.01); *H04W 12/068* (2021.01); *H04W 88/02* (2013.01)

(58) Field of Classification Search
None
See application file for complete search history.

(56) References Cited

U.S. PATENT DOCUMENTS

| | | | | |
|---|---|---|---|---|
| 5,883,810 | A | * | 3/1999 | Franklin ................ G06Q 20/02 235/379 |
| 9,038,887 | B1 | | 5/2015 | O'Hanlon |
| 9,836,742 | B2 | | 12/2017 | Mongillo, III et al. |
| 2001/0051924 | A1 | * | 12/2001 | Uberti .................... G06Q 20/02 705/44 |
| 2003/0163710 | A1 | * | 8/2003 | Ortiz ................... H04L 63/0861 713/186 |
| 2008/0172598 | A1 | * | 7/2008 | Jacobsen ............... G06F 17/243 715/224 |
| 2008/0235351 | A1 | * | 9/2008 | Banga ................... G06F 15/173 709/218 |

(Continued)

FOREIGN PATENT DOCUMENTS

WO 2014176688 A1 11/2014

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.

(57) ABSTRACT

In a computer-implemented method for pre-populating a credit card number field a credit card number is stored at a remote location by a credit card issuer, and a credit card number field is pre-populated with the stored credit card number for an online payment, wherein the pre-populating is provided by the credit card issuer.

12 Claims, 8 Drawing Sheets

(56) References Cited

U.S. PATENT DOCUMENTS

| | | | |
|---|---|---|---|
| 2009/0289110 A1* | 11/2009 | Regen | G06F 3/03543 235/380 |
| 2010/0241571 A1* | 9/2010 | McDonald | G06Q 20/12 705/74 |
| 2011/0184856 A1 | 7/2011 | Shakkarwar | |
| 2011/0295748 A1 | 12/2011 | Woodriffe | |
| 2012/0197801 A1* | 8/2012 | Jimenez | G06Q 20/206 705/44 |
| 2012/0290449 A1* | 11/2012 | Mullen | G06Q 10/00 705/27.2 |
| 2013/0085938 A1 | 4/2013 | Stone et al. | |
| 2013/0110705 A1 | 5/2013 | Conwell | |
| 2013/0198004 A1 | 8/2013 | Bradley et al. | |
| 2014/0070001 A1* | 3/2014 | Sanchez | G06Q 20/40 235/380 |
| 2014/0136349 A1 | 5/2014 | Dave et al. | |
| 2014/0244494 A1* | 8/2014 | Davis | G06Q 20/227 705/41 |
| 2015/0262174 A1 | 9/2015 | Mongillo, III et al. | |
| 2016/0148309 A1 | 5/2016 | Canapini et al. | |
| 2016/0155191 A1 | 6/2016 | Walz et al. | |
| 2016/0189135 A1 | 6/2016 | Hird et al. | |

OTHER PUBLICATIONS

Anna Schaverien; "Five Reasons Why Amazon Is Moving Into Bricks-And-Mortar Retail"; Dec. 29, 2018 (Year: 2018).*

Nano8Blazex; "How can I get Google Chrome to auto-fill more form entries?"; Sep. 3, 2011; superuser.com; https://superuser.com/questions/186826/how-can-i-get-google-chrome-to-auto-fill-more-form-entries (Year: 2011).*

Office Action for CA App No. 2909392 dated Oct. 30, 2020, 4 pages.

* cited by examiner

```
ACCESS USER INPUT OF CREDIT APPLICATION INFORMATION VIA THE
MOBILE DEVICE FOR PROCESSING OF A CREDIT CARD APPLICATION,
WHEREIN THE CREDIT APPLICATION INFORMATION IS NUMERICAL
INFORMATION
610
          ↓
INPUT THE CREDIT CARD INFORMATION IN THE CREDIT CARD
APPLICATION VIA THE MOBILE DEVICE, WHEREIN THE CREDIT CARD
APPLICATION IS FOR ESTABLISHING A CREDIT CARD ACCOUNT
620

PRESENT APPROVAL OF A CREDIT CARD ACCOUNT BASED ON THE
CREDIT APPLICATION INFORMATION AT THE MOBILE DEVICE
630

DISPLAY A LINK TO AN APPLICATION FORM AT THE MOBILE DEVICE
640

DISPLAY THE CREDIT CARD APPLICATION AT THE MOBILE DEVICE
650

REDEEM A REWARD AT THE MOBILE DEVICE, WHEREIN THE REWARD IS
ASSOCIATED WITH THE CREDIT CARD ACCOUNT
660

STORE A DIGITAL CREDIT CARD ASSOCIATED WITH THE CREDIT CARD
ACCOUNT AT THE MOBILE DEVICE
670

STORE A DIGITAL CREDIT CARD ASSOCIATED WITH THE CREDIT CARD
ACCOUNT AT THE MOBILE DEVICE VIA TEXT MESSAGING
680

AUTHENTICATE THE USER WITH BIOMETRICS
690
```

```
STORE A CREDIT CARD NUMBER AT A REMOTE LOCATION
BY A CREDIT CARD ISSUER
710
```

```
PRE-POPULATE A CREDIT CARD NUMBER FIELD WITH THE
STORED CREDIT CARD NUMBER FOR AN ONLINE PAYMENT,
WHEREIN THE PRE-POPULATING IS PROVIDED BY THE
CREDIT CARD ISSUER
720
```

```
AUTHENTICATE A USER ASSOCIATED WITH THE CREDIT
CARD NUMBER PRIOR TO THE PRE-POPULATING
730
```

PRE-POPULATING A CREDIT CARD NUMBER FIELD

RELATED APPLICATIONS

This application is related to co-pending U.S. application Ser. No. 14/556,842, filed on Dec. 1, 2014, entitled "APPLYING FOR A CREDIT CARD ACCOUNT ON A MOBILE DEVICE," by James Walz et al. assigned to the assignee of the present application.

BACKGROUND

In some conventional systems, there are various limitations to utilizing a digital credit card with a mobile device. For example, the functionality of various mobile applications does not allow for applying for a credit card via a mobile device or redeeming loyalty rewards via the mobile device.

Moreover, in some instances, a digital credit card number is accessible on a mobile device. However, the credit card number on the mobile device is not advantageous for online purchases.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

I. Credit Card Application Via a Mobile Device

Figure 1:
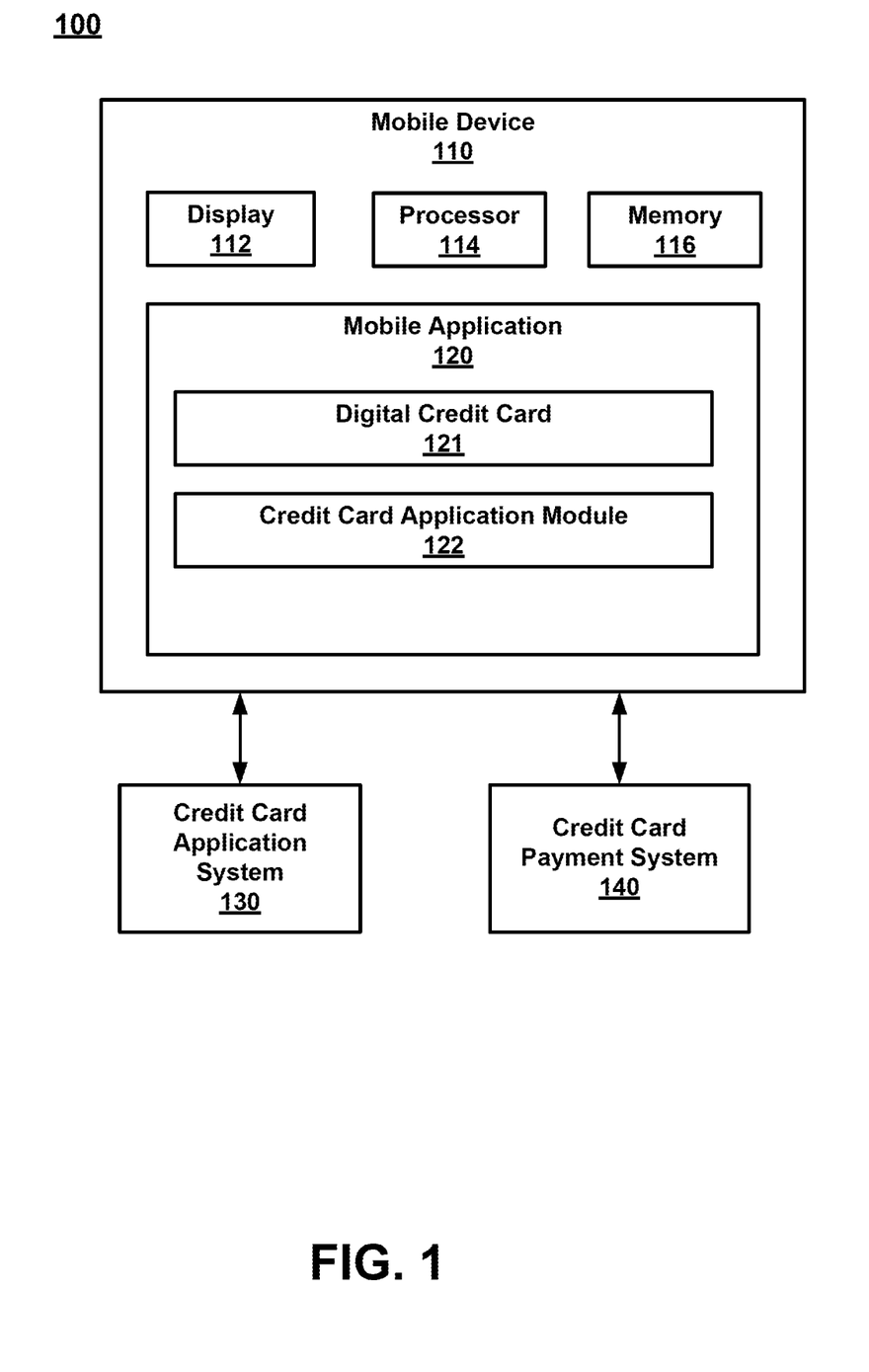
FIG. 1 is a block diagram that illustrates an embodiment of a mobile device system.

FIG. 1 depicts system 100 that, among other things, enables for credit card applications via mobile device 110. That is, system 100 enables processes related to application for a credit card, registration of a credit card, and use of a credit card through a mobile application executing on a mobile device.

The credit card, in one embodiment, is a private label credit card. A private label credit card is branded for a specific retailer, independent dealer or manufacturer. A third-party, such as the card issuer, issues the cards and collects the payments from cardholders.

It should be appreciated that the credit card application process, as described herein, may also be accomplished at a kiosk or similar computing device at a retail store.

Additionally, system 100 provides for mobile experiences that allow consumers to go from being a non-credit customer to being a customer that can use a credit card.

System 100 includes mobile device 110 that includes various components such as, but not limited to, display 112, processor 114, memory 116 and various mobile applications (e.g., mobile application 120) that are downloaded and executable on mobile device 110.

Mobile device 110 can be any mobile computing device such as a mobile phone, smart phone, PDA, computing tablet (e.g., iPad), etc.

Mobile application 120 is an application that is downloaded on mobile device 110 and is executed by processor 114.

In one embodiment, mobile application 120 may be provided by a retailer, such as any retailer that provides goods (e.g., apparel, accessories) for sale via online and/or via brick and mortar stores.

In another embodiment, mobile application 120 is provided by a credit card issuer that issues and processes credit cards for various credit card programs.

Mobile application 120 includes various modules related to obtaining and utilizing a credit card account.

Credit card application module 122 is configured to facilitate in processing a credit card application via mobile application 120 executing on mobile device 110.

It is noted that a user can apply for a credit card at any location where the mobile device is able to receive the requisite cell phone service or internet service. For example, the user may apply for a credit card when the user is not in a brick and mortar store of a given retailer at which the credit card may be used.

Module 122 may prompt a user for credit application information. In one embodiment, the credit card application is numerical information (e.g., address, social security number, zip code, date of birth, etc.). Alternatively, module 122 may prompt a user for non-numerical information (e.g., name).

Additionally, mobile device 110 may enable interactive voice response (IVR). For example, a user may be prompted for credit application information and the user may speak the answer. As such, the IVR functionality enables mobile device 110 to recognize the speech of the user and translate the speech into entered data in the credit card application form.

Mobile device 110 may be owned by the user who is applying for the credit card. Accordingly, the user may enter the personal credit application information in privacy. As a result, the personal credit application information is not written down and cannot be viewed by others and potentially used for nefarious means.

The user provides the credit application information via display 112. For example, the user types in the information on display 112 which is a touch screen display.

The information is transmitted to credit card application system 130 for processing. System 130 processes the provided credit application information to determine if the user is qualified for a credit account.

System 130 can include a credit bureau or consumer reporting agency (e.g., Experian, Equifax, etc.) that provides a credit score or other credit determinative analysis based on the provided credit application information. Additionally, system 130 is managed/controlled by the credit card issuer.

If the credit card application is approved, the approval is transmitted to credit card application module 122 from credit card application system 130. The approval is then presented to the user via display 122. The approval and/or disapproval of the credit card application is displayed to user on mobile device 110. As a result, approval and/or disapproval is also kept private.

Once approved for a credit card, the user may progress through various other credit card related processes via the mobile device, such as, applying for a credit card to creating/registering a credit card management account, enrolling for a digital credit card, such as digital credit card 121.

A digital or electronic credit card is an electronic or digital version of a physical credit card.

The credit card account enables a user to make payments with the credit card payment system 140 which manages and controls the credit card account. For example, credit card payment system 140 is managed and controlled by the card issuer, such as a private label card issuer.

The digital credit card, in one embodiment, is displayed via display 112. The digital credit card may display the credit card number.

Digital credit card 128 can be any digital credit card that is able to be displayed on display 112 and utilized for purchases. In one embodiment, digital credit card 128 is implemented via application 120. When a user of device 110 selects application 120 to be utilized, processor 114 executes application 120 such that digital credit card 128 is eventually displayed on display 112.

It should be appreciated that the application form or link to the application form may accessed by various means.

In one embodiment, a user may scan a QR code or the like. For example, a user scans a QR code at a retail store by a scanning feature on mobile device 110. In response, a link to the application form or the application form is displayed to the user via mobile device 110. The user is then able to complete the application from the mobile device.

In another embodiment, a link to the application form may be accessed by text messaging functionality supported by mobile device 110.

For example, a text may be sent to the user and received on mobile device 110. The text may include a link to the credit card application form. In response to the user selecting the link on the text, the application form is displayed to the user via mobile device 110.

II. Cloud-Based Digital Credit Card

In some instances, at the time of an online purchase of items (e.g., goods, services, etc.), the credit card number may not be available or known. For example, a user cannot locate his/her credit card in order to enter the credit card information at the online checkout.

Additionally, some retailers are only an ecommerce retailer. That is, they do not have a brick and mortar retail location. Moreover, a digital credit card may not be of benefit to the user for purchasing items from the retailer because the credit card information typically has to be manually entered at the online checkout to purchase the items from the retailer.

Figure 2:
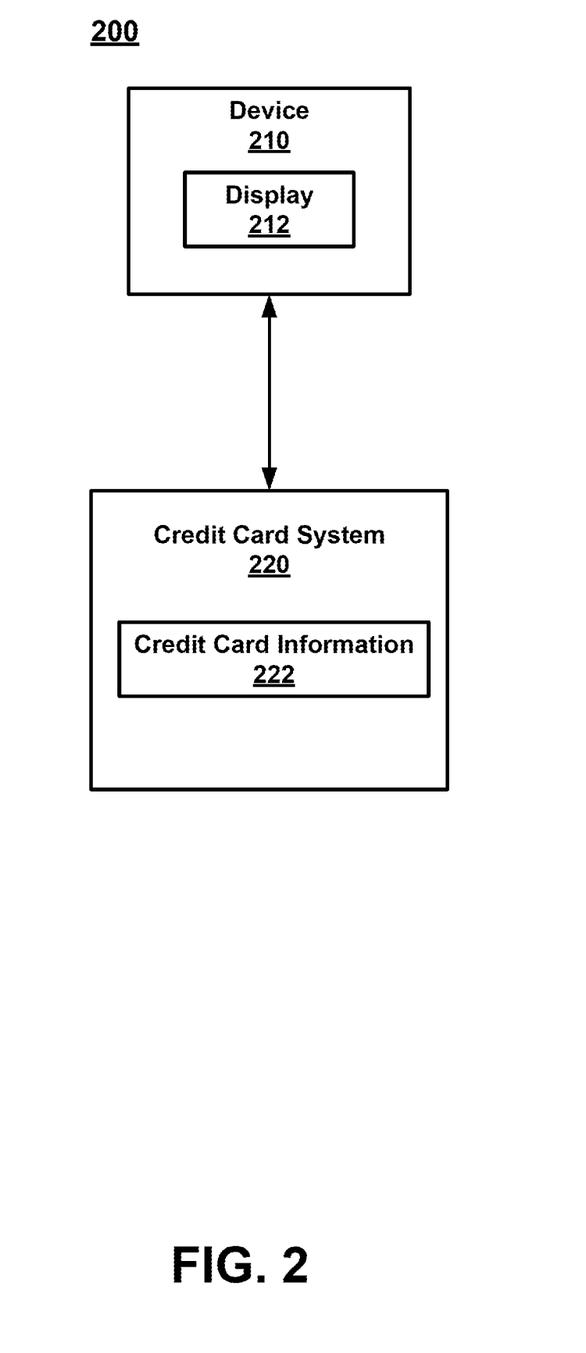
FIG. 2 is a block diagram that illustrates an embodiment of a mobile device system.

FIG. 2 depicts system 200 that enables for a cloud-based digital credit card such that the credit card information may be pre-populated (if needed) in a relevant field at an online checkout.

Figure 3:
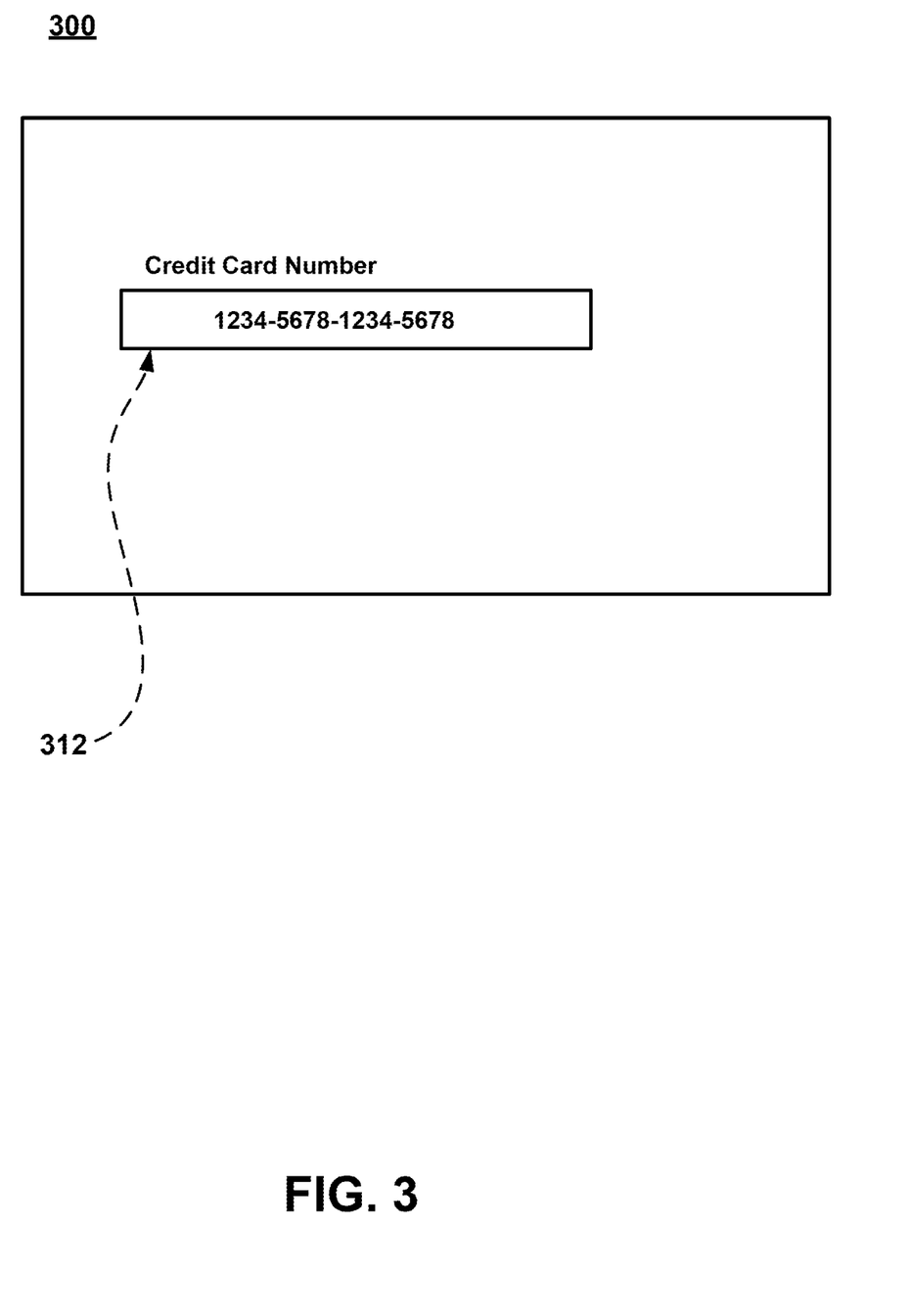
FIG. 3 depicts an embodiment of a screenshot for pre-population of credit card information.

Additionally, FIG. 3 depicts an embodiment of a screenshot of online checkout 300. Online checkout 300 prompts a user for information in order to purchase items online. In particular, online checkout prompts a user for a credit card number to be entered in field 312. It should be appreciated that online checkout 300 may include fields requesting various information such as, but not limited to, name, address, email address, etc.

Referring to at least FIGS. 2 and 3, a user shops online for items on device 210 by viewing and selecting items displayed on display 212. The user intends to purchase the items online from a retailer that enables purchase of the items. The retailer, in one embodiment, is an ecommerce only retailer.

While at online checkout 300, the user intends to purchase the items with a credit card (e.g., digital credit card 121). However, the user is unable to provide the particular credit card number at the checkout for purchasing the desired items.

Online checkout 300 may enable a user to select the type of credit card to use, such as, Visa, MasterCard, or a private label credit card. The private label credit card may be associated with the retailer of the items that the user intends to purchase.

Moreover, online checkout 300 may query a user to determine if the user is able to enter the credit card number for the credit card the user intends to use. If the user is unable to provide the credit card number in field 312, the user selects a button or the like to indicate that he/she cannot provide the credit card number.

In one embodiment, in response to a user indicating that he/she is unable to provide the credit card number in field, a pop-up window is displayed that prompts a user for a username and password to access credit card system 220. Credit card system 212 includes credit card information 222 (e.g., credit card number) that is associated with the credit card that the user intends to use.

Credit card system 220, in one embodiment, is or includes credit card payment system 140. Credit card system 220 may be managed and controlled by the card issuer, such as a private label card issuer.

Responsive to accessing credit card system 220, credit card information (e.g., credit card number) is pre-populated into field 312. As a result, credit card number may be pre-populated into an online checkout and the user may purchase items without manually entering a credit card number into the online checkout.

In various embodiments, the functionality of pre-populating a credit card number, as described herein, may be provided via an application programming interface (API). The API may be created by the card issuer and coupled with the retail website.

III. Rewards Redemption Via a Mobile Device

A user may a member of a loyalty program associated with a credit card, such as a private label credit card. In general, a loyalty program is a structured marketing effort that rewards, and therefore encourages, loyal buying behavior associated with the credit card (e.g., digital credit card 121). Some rewards include, but are not limited to, discounts, coupons, etc. For example, upon accumulating "points" with loyalty program, the user may redeem a reward (e.g., a coupon to purchase an item at a lower price) based on the accumulation the "points."

Figure 4:
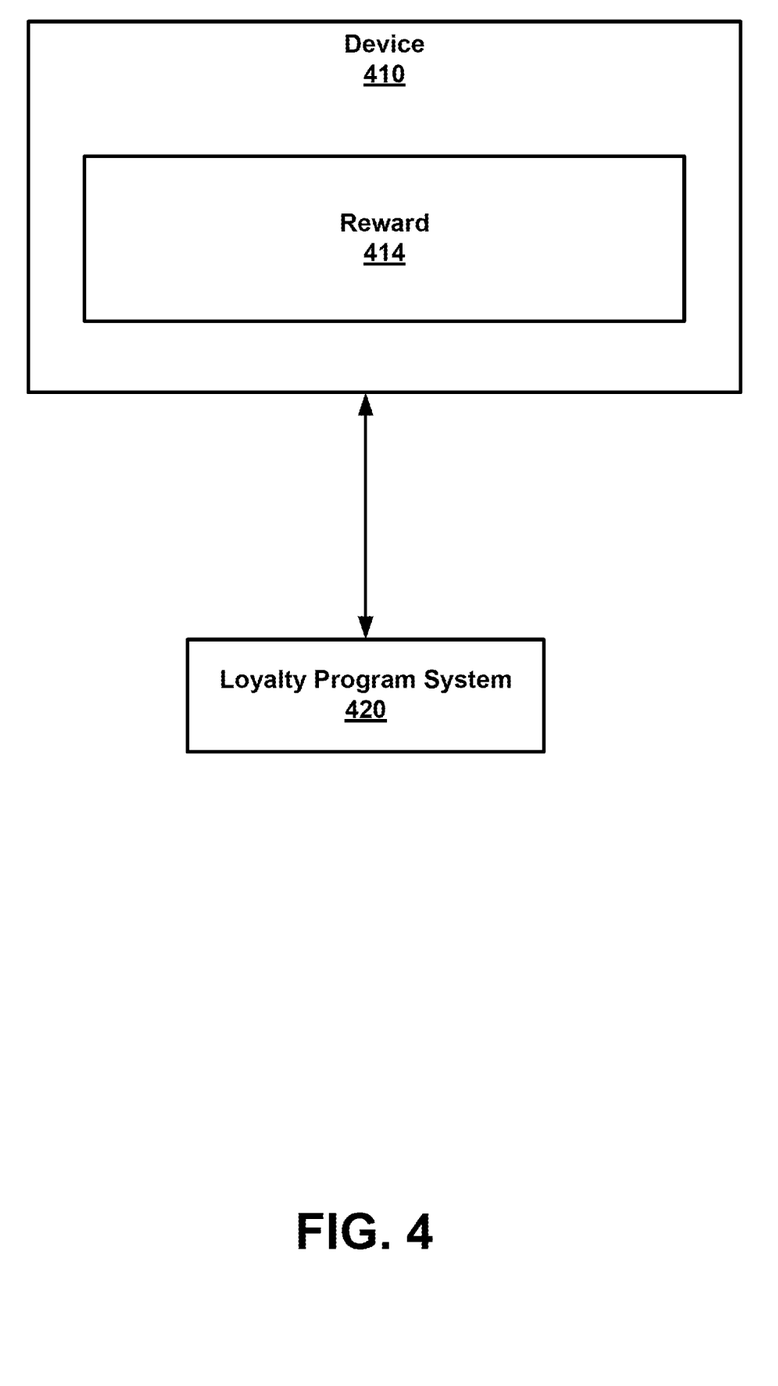
FIG. 4 is a block diagram that illustrates an embodiment of a system for redeeming rewards via a mobile device.

FIG. 4 depicts a block diagram of loyalty program system 420 communicatively coupled to device 410 such that reward 414 of the loyalty program are enabled to be redeemed via device 410.

Loyalty program system 420 manages/controls the loyalty program that is associated with the credit card (e.g., private label credit card). The issuer of the credit card may control the loyalty program system.

Reward 414 (e.g., coupon) is displayed on device 410. Reward 414 may be presented to a sales associate (similar to digital credit card 121) and the reward may be redeemed.

Reward 414 may be in the form of a digital gift card, digital coupon, etc.

Reward 414 may include a barcode (e.g., QR code). As such, reward 414 may be scanned to be redeemed.

Digital credit card 121 is displayed on the mobile device. The digital credit card may present information to the user regarding the loyalty program, such as the number points, coupons, etc.

In one embodiment, the digital credit card includes a button that enables the redemption of the rewards of the loyalty program. For example, the digital credit card displays "You have 1000 points!" In response to selecting a button associated with the displayed text, reward 414 (e.g., a coupon) is displayed on mobile device 410. The reward may then be redeemed. If the reward is a coupon for a particular item, the coupon may be redeemed for purchase of the item at a lower price.

IV. Storing a Digital Credit Card on a Mobile Device

In some conventional mobile devices, information that is displayed on the mobile device while the mobile device in "on-line" or has internet connectivity (either through cell phone service, wifi connectivity, etc.) may not be able to be accessed and displayed when the mobile device is "off-line" or does not have internet connectivity. For instance, a mobile device may be able to display a digital credit card when the mobile device has internet connectivity. However, when the mobile device does not have internet connectivity the digital credit card is unable to be displayed.

A device may be off-line at various instances. For example, the mobile device is in a "dead spot" and cannot receive signal from the cell phone service. In another example, in a "captive portal," a mobile device may be connected to a WiFi signal but the mobile device is not authenticated. As a result, the mobile device acts as if it were off-line in some scenarios.

In contrast, referring to FIG. 1, digital credit card 121 is able to be displayed on mobile device 110 when mobile device does have and does not have connectivity (e.g., on-line or off-line).

For example, digital credit card 121 is stored in local memory 116 of mobile device 110. Accordingly, digital credit card 121 is accessible from memory 116 and is able to be displayed when the mobile device is off-line.

In one embodiment, digital credit card 121 (or the credit card number of the digital credit card) is encrypted when stored on the mobile device. The digital credit card may be stored and encrypted for a period of time. After such period of time, the digital credit card may be stored again in memory for use when the mobile device is off-line.

Digital credit card 121 (or the credit card number of the digital credit card), in one embodiment, is available for storage on mobile device 110 when the user logs into mobile application and gains access to digital credit card 121.

It should be appreciated that the local storage of digital credit card 121 is configurable. That is, a user may select the option to store the digital credit card locally or may select the option that the digital credit card may not be stored locally.

V. Managing a Digital Credit Card on a Mobile Device Via Text Messaging

Digital credit card 121, in one embodiment, may be managed on mobile device via a mobile application that acts like a digital wallet (e.g., Passbook). In general, Passbook is an application in iOS that allows users to store coupons, boarding passes, event tickets, store cards, 'generic' cards and other forms of mobile payment. Accordingly, Passbook or the like provides a single location for access of various items.

In various embodiments, digital credit card 121 may be located in the digital wallet via a text message. For example, a text message is received at mobile device 110. The text message includes a link to a webpage. The webpage enables the digital credit card to be added to the digital wallet on the mobile device.

In another embodiment, various offers (e.g., coupons) may be located in the digital wallet via a text message. For example, a text message is received at mobile device 110. The text message includes a link to a webpage. The webpage enables the offers (e.g., coupons) to be added to the digital wallet on the mobile device.

VI. Utilizing Biometrics with a Digital Credit Card

Transactions involving digital credit card 121 may be authenticate by biometrics. In some instances, the biometrics may take the place of standard user ID and password authentications. Biometrics can include, but are not limited to, thumb print scanning, voice detection, heart rate monitoring, etc.

In one scenario, a user intends to purchase an item with digital credit card 121 located on mobile device 110. In order to unlock mobile device 110 (rather than provide a passcode or the like), the user provides a thumbprint on a scanning device on mobile device 110 to unlock the phone.

The user then selects mobile application 120 to access digital credit card 121. In order to authenticate the user, the user provides a thumbprint. If the user is authenticated via the provide thumbprint, the application continues to execute and the digital credit card 121 is displayed on display 112.

VII. Example Methods of Operation

The following discussion sets forth in detail the operation of some example methods of operation of embodiments. With reference to FIGS. 5, 6, 7 and 8, flow diagrams 500, 600, 700 and 800 illustrate example procedures used by various embodiments. Flow diagrams 500-800 include some procedures that, in various embodiments, are carried out by a processor under the control of computer-readable and computer-executable instructions. In this fashion, procedures described herein and in conjunction with diagrams 500-800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments and/or cloud environments. The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in diagrams 500-800, such procedures are examples. That is, embodiments are well suited to performing various other procedures or variations of the procedures recited in diagrams 500-800. Likewise, in some embodiments, the procedures in diagrams 500-800 may be performed in an order different than presented and/or not all of the procedures described in one or more of these flow diagrams may be performed. It is further appreciated that procedures described in diagrams 500-800 may be implemented in hardware, or a combination of hardware with firmware and/or software.

Figure 5:
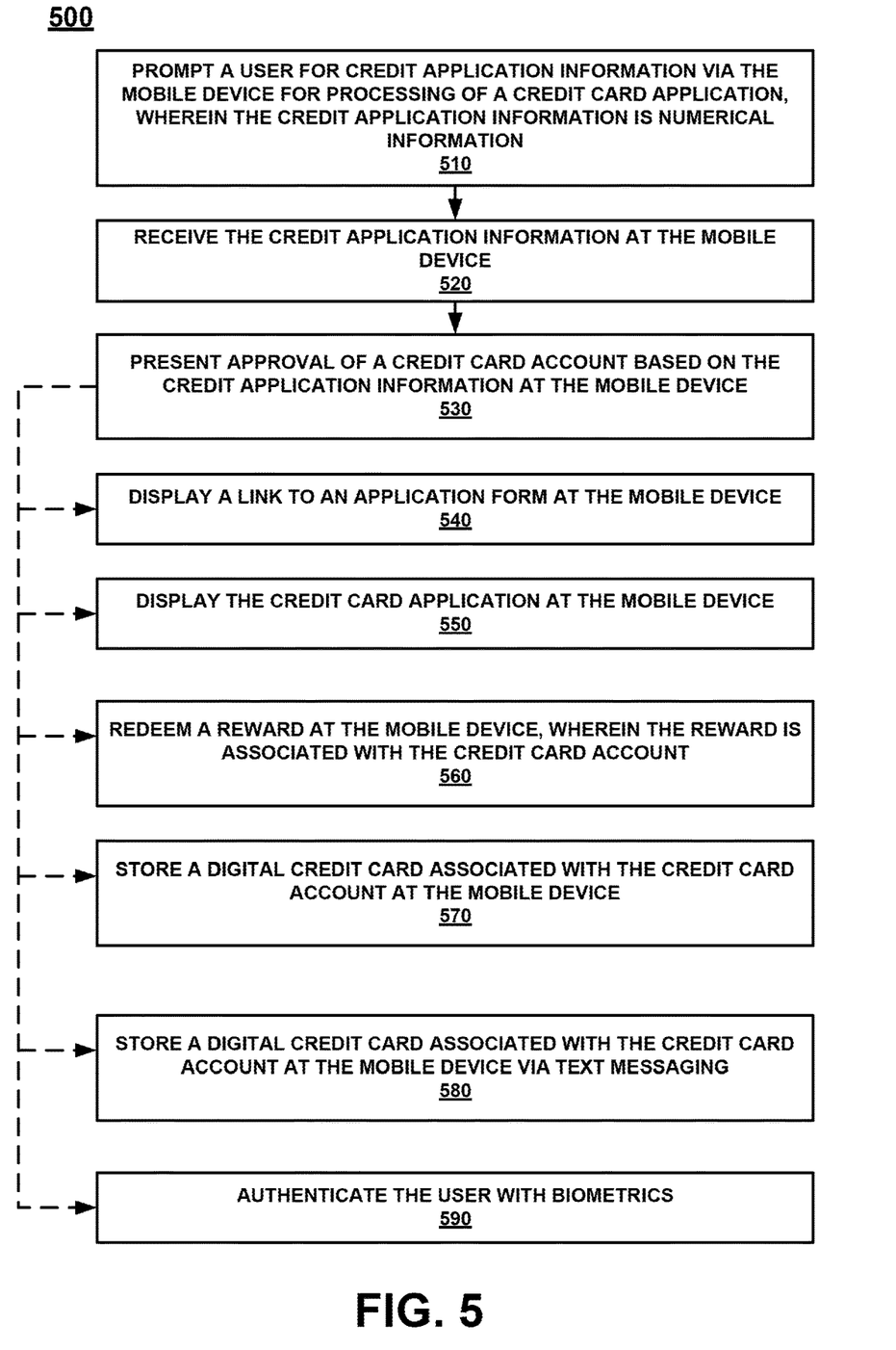
FIG. 5 depicts a flow diagram for a method for applying for a credit card account on a mobile device, according to various embodiments.

FIG. 5 depicts a process flow diagram 500 for a method for applying for a credit card account on a mobile device, according to various embodiments.

At 510, a user is prompted for credit application information via the mobile device for processing of a credit card application, wherein the credit application information is numerical information. For example, a credit card form requires numerical information (e.g., date of birth, house number, zip code, social security number, etc.) to be filled in to complete the credit card application. The user of the mobile device is prompted for the numerical information to completely the credit card application.

At 520, receive the credit application information at the mobile device. For example, the user enters in the credit card application information at the mobile device in response to being prompted for the information.

At 530, present approval of a credit card account based on the credit application information at the mobile device. For example, if the credit card application is approved, then the approval is displayed to the user.

At 540, display a link to an application form at the mobile device. For example, a user receives a text message that includes a link to the credit card application. When the link is selected the application is displayed to the user.

At 550, display the credit card application at the mobile device. For example, credit card application module 122 displays a credit card application to the user.

At 560, redeem a reward at the mobile device, wherein the reward is associated with the credit card account. For example, a user accumulates points in a loyalty program associated with digital credit card 121. Accordingly, the user may redeem reward 414 (e.g., a coupon) for obtaining a predetermined number of points.

At 570, store a digital credit card associated with the credit card account at the mobile device. For example, digital credit card 121 is stored in memory 116 of mobile device 110. Accordingly, digital credit card 121 may be accessed and displayed when mobile device is off-line.

At 580, store a digital credit card associated with the credit card account at the mobile device via text messaging. For example, a user receives a text message that includes a link to a website, wherein the website enables the storage of digital credit card or other payment features (e.g., coupons) to be stored on mobile device 110. The storage of the digital credit card or other payment features may be provided by the Passbook mobile application.

At 590, authenticate the user with biometrics. For example, when a user is utilizing digital credit card 121 for a payment method, the user may be required to be authenticated via a thumbprint.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

Figure 6:
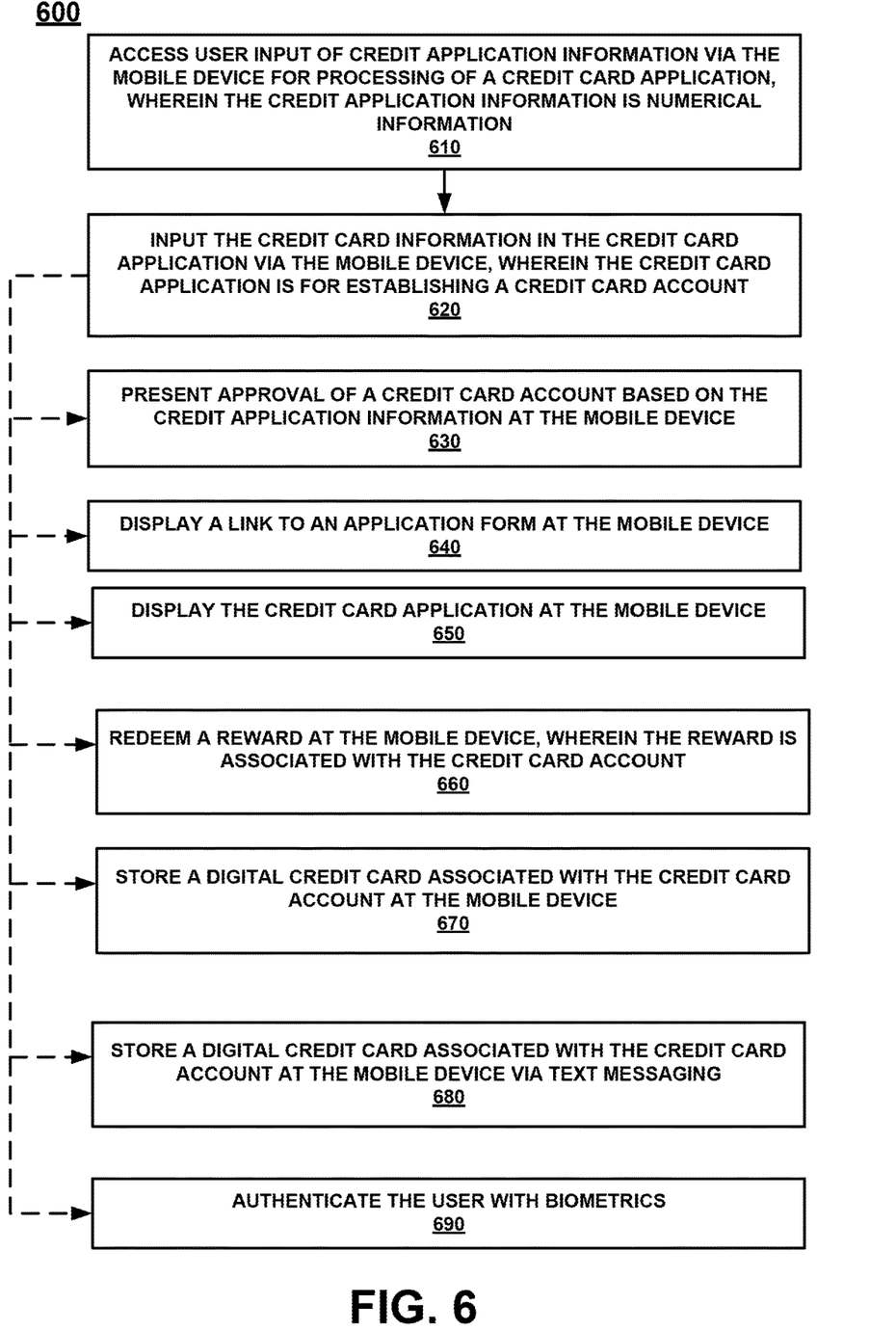
FIG. 6 depicts a flow diagram for a method for applying for a credit card account on a mobile device, according to various embodiments.

FIG. 6 depicts a process flow diagram 600 for applying for a credit card account on a mobile device, according to various embodiments.

At 610, access user input of credit application information via the mobile device for processing of a credit card application, wherein the credit application information is numerical information. For example, the user enters in the credit card application information at the mobile device in response to being prompted for the information. The entered information is accessed by credit card application module 122 for further processing of the credit card application.

At 620, input the credit card information in the credit card application via the mobile device, wherein the credit card application is for establishing a credit card account. For example, the user input is accessed by credit card application module 122 and automatically entered into the credit card application.

At 630, present approval of a credit card account based on the credit application information at the mobile device. For example, if the credit card application is approved, then the approval is displayed to the user.

At 640, display a link to an application form at the mobile device. For example, a user receives a text message that includes a link to the credit card application. When the link is selected the application is displayed to the user.

At 650, display the credit card application at the mobile device. For example, credit card application module 122 displays a credit card application to the user.

At 660, redeem a reward at the mobile device, wherein the reward is associated with the credit card account. For example, a user accumulates points in a loyalty program associated with digital credit card 121. Accordingly, the user may redeem reward 414 (e.g., a coupon) for obtaining a predetermined number of points.

At 670, store a digital credit card associated with the credit card account at the mobile device. For example, digital credit card 121 is stored in memory 116 of mobile device 110. Accordingly, digital credit card 121 may be accessed and displayed when mobile device is off-line.

At 680, store a digital credit card associated with the credit card account at the mobile device via text messaging. For example, a user receives a text message that includes a link to a website, wherein the website enables the storage of digital credit card or other payment features (e.g., coupons)

to be stored on mobile device 110. The storage of the digital credit card or other payment features may be provided by the Passbook mobile application.

At 690, authenticate the user with biometrics. For example, when a user is utilizing digital credit card 121 for a payment method, the user may be required to be authenticated via a thumbprint.

It is noted that any of the procedures, stated above, regarding flow diagram 600 may be implemented in hardware, or a combination of hardware with firmware and/or software. For example, any of the procedures are implemented by a processor(s) of a cloud environment and/or a computing environment.

Figure 7:
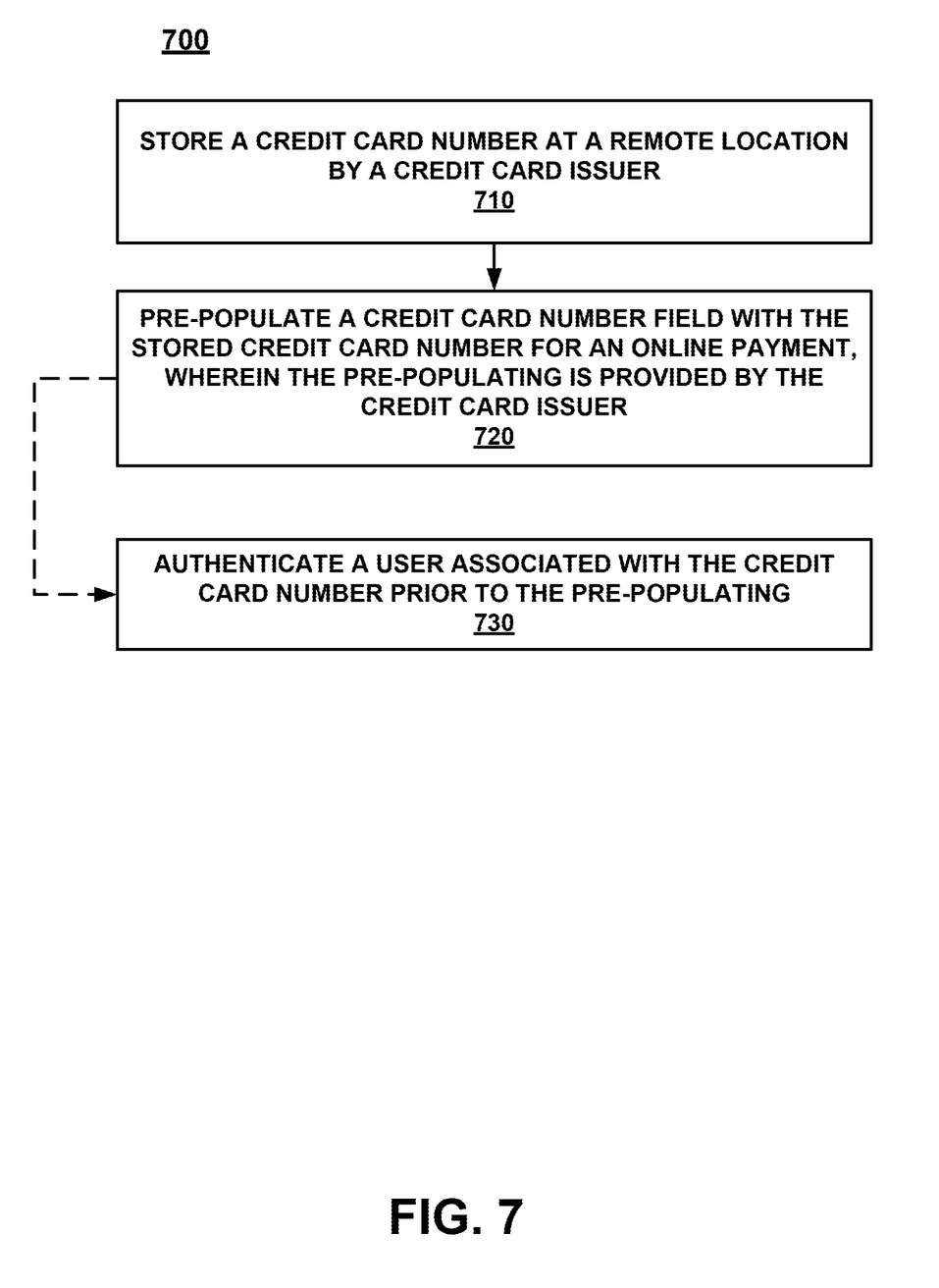
FIG. 7 depicts a flow diagram for a method for pre-populating a credit card number field, according to various embodiments.

FIG. 7 depicts a process flow diagram 700 for applying for pre-populating a credit card number field, according to various embodiments.

At 710, store a credit card number at a remote location by a credit card issuer. For example, the card issuer of digital credit card 121 stores credit card information 222 in credit card system 220.

At 720, pre-populate a credit card number field with the stored credit card number for an online payment, wherein the pre-populating is provided by the credit card issuer. For example, if a user is not able to manually enter the credit card number in field 312, then the user can provide instructions to have the credit card number automatically pre-populated in field 312.

At 730, authenticate a user associated with the credit card number prior to the pre-populating. For example, prior to pre-populating field 312, the user is authenticated. In particular, a user provides a username and password to be authenticated by credit card system 220.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

Figure 8:
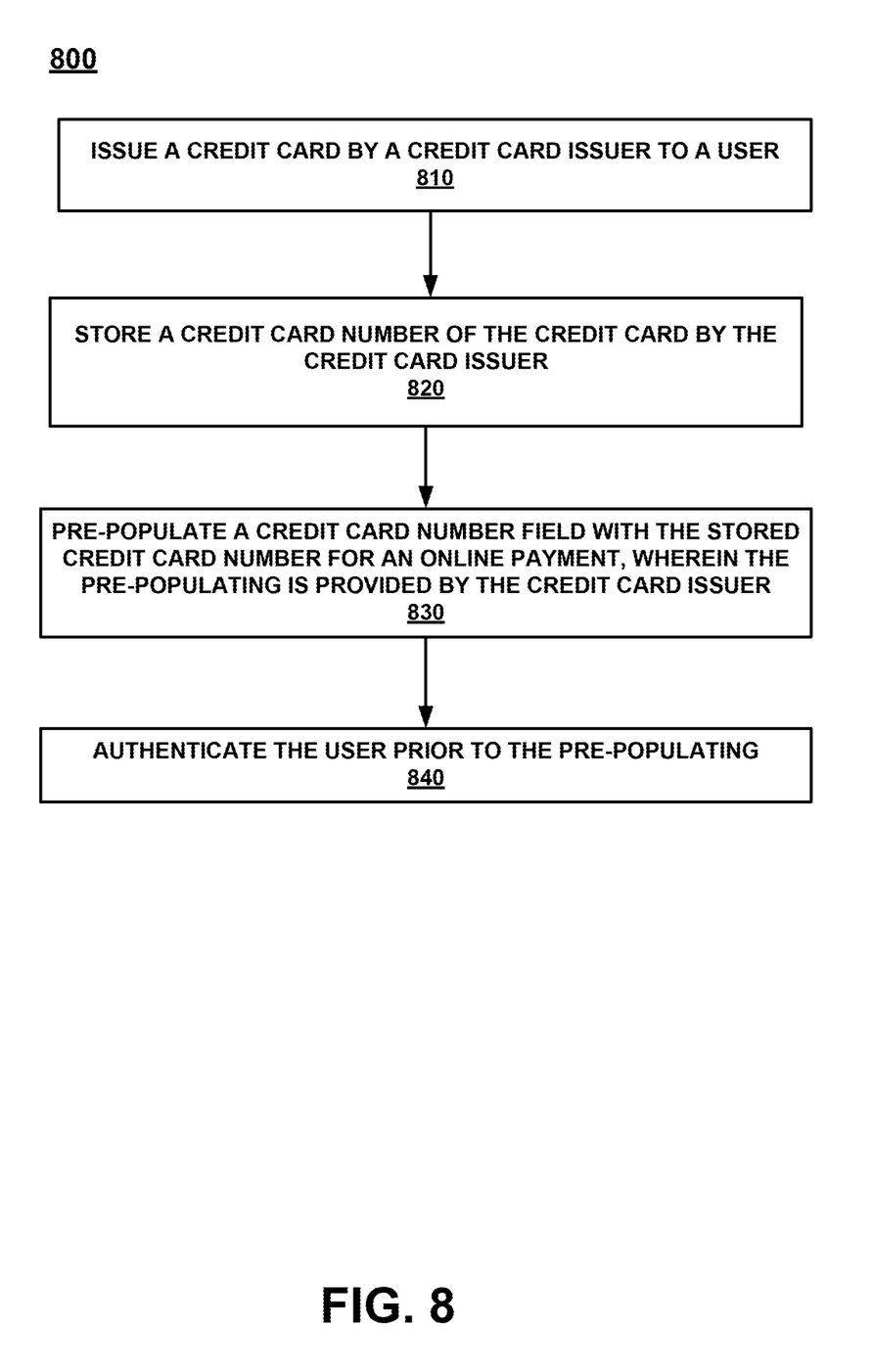
FIG. 8 depicts a flow diagram for a method for pre-populating a credit card number field, according to various embodiments.

FIG. 8 depicts a process flow diagram 800 for applying for pre-populating a credit card number field, according to various embodiments.

At 810, issue a credit card by a credit card issuer to a user. For example, a credit card issuer issues a credit card to the user.

At 820, store a credit card number of the credit card by the credit card issuer. For example, the card issuer of digital credit card 121 stores credit card information 222 in credit card system 220.

At 830, pre-populating a credit card number field with the stored credit card number for an online payment, wherein the pre-populating is provided by the credit card issuer. For example, if a user is not able to manually enter the credit card number in field 312, then the user can provide instructions to have the credit card number automatically pre-populated in field 312.

At 840, authenticate the user prior to the pre-populating. For example, prior to pre-populating field 312, the user is authenticated. In particular, a user provides a username and password to be authenticated by credit card system 220.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

Example embodiments of the subject matter are thus described. Although various embodiments of the have been described in a language specific to features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

The invention claimed is:

1. A computer-implemented method for pre-populating a credit card number field, comprising:
storing, at a remote computing device associated with a credit card issuer, a particular credit card number;
receiving, at the remote computing device and from a local computing device, a request for the remote computing device to automatically provide the particular credit card number to the credit card number field of an online website of an ecommerce only retailer hosted by a third computing device,
the remote computing device, the local computing device and the third computing device hosting the online website are each distinct,
the request indicating that a user of the local computing device does not manually provide the particular credit card number to the credit card number field of the online website hosted by the third computing device;
providing, from the remote computing device and to the local computing device, a request for an authentication of the user;
receiving, at the remote computing device and from the local computing device, an authentication information for the user,
the authentication information for the user comprising: a biometric information about the user, wherein said biometric information is information obtained based on a heart rate of the user,
the biometric information used in place of a user identifier and password authentication; and
pre-populating, by the remote computing device and after the authentication of the user, the credit card number field of the online website hosted by the third computing device with said stored particular credit card number without providing access to the stored particular credit card number at the local computing device.

2. The computer-implemented method of claim 1, wherein said particular credit card number is of a private label credit card.

3. The computer-implemented method of claim 1, wherein said particular credit card number is of a digital credit card.

4. The computer-implemented method of claim 1, wherein said biometric information is information obtained based on a thumb print scan of the user.

5. The computer-implemented method of claim 1, wherein said biometric information is information obtained based on a voice detection of the user.

6. The computer-implemented method of claim 1, wherein said request for the authentication of the user further comprises: a request for a username and a password for the user.

7. A computer-implemented method for pre-populating a credit card number field, comprising:
issuing a credit card by a credit card issuer to a user;
storing, at a remote computing device associated with the credit card issuer, a particular credit card number of said credit card;

receiving an indication, at a local computing device, that the user does not manually provide the particular credit card number to the credit card number field of an online website of an ecommerce only retailer hosted by a third computing device, the remote computing device, the local computing device and the third computing device hosting the online website are each distinct;

providing, from the local computing device to the remote computing device, a request for the remote computing device to automatically provide the particular credit card number to the credit card number field of the online website hosted by the third computing device, receiving, at the local computing device and from the remote computing device, a request for an authentication of the user;

providing, from the local computing device and to the remote computing device, an authentication information for the user, the authentication information for the user comprising: a biometric information about the user, wherein said biometric information is information obtained based on a heart rate of the user, the biometric information used in place of a user identifier and password authentication;

authenticating, at the remote computing device, the user based on the authentication information; and pre-populating, by the remote computing device and after the authentication of the user, the credit card number field of the online website hosted by the third computing device with said particular credit card number without providing the stored particular credit card number to the local computing device.

8. The computer-implemented method of claim 7, wherein said particular credit card number is of a private label credit card.

9. The computer-implemented method of claim 7, wherein said particular credit card number is of a digital credit card.

10. The computer-implemented method of claim 7, wherein said request for the authentication of the user further comprises: a request for a username and a password for the user.

11. The computer-implemented method of claim 7, wherein said biometric information is information obtained based on a thumb print scan of the user.

12. The computer-implemented method of claim 7, wherein said biometric information is information obtained based on a voice detection of the user.

* * * * *